Patented Apr. 18, 1950

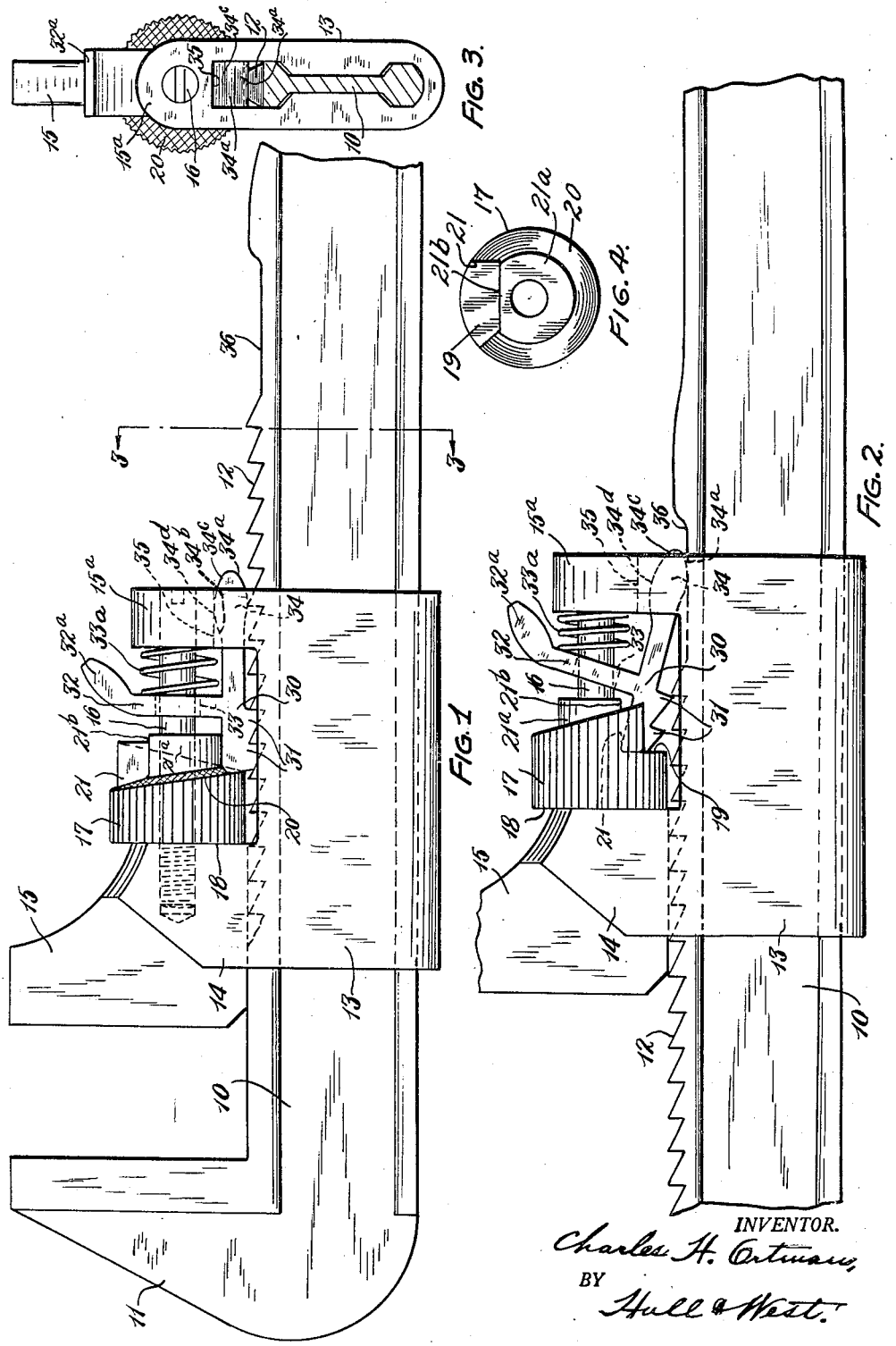

2,504,721

UNITED STATES PATENT OFFICE 2,504,721

PIVOTED RACK CATCH SLIDING JAW WRENCH

Charles H. Ortman, Chardon, Ohio

Application December 22, 1945, Serial No. 636,934

5 Claims. (Cl. 81—145)

This invention relates to clamping devices, and more particularly to a clamping device of the type shown and described in my application No. 585,460, filed March 29, 1945.

The clamping device shown and described in the aforesaid application comprises a handle having ratchet teeth on its upper surface and a fixed jaw at one end thereof, a sleeve mounted for adjustment along said handle and provided with a movable jaw, a shaft supported between front and rear extensions of the sleeve, a pawl interposed between the shaft and the ratchet teeth and having a vertical arm provided with an opening through which the shaft extends, a spring surrounding the shaft and interposed between the rear surface of the said arm and the rear extension of said sleeve, a cam mounted on said shaft and adapted, when rotated to one position, to hold the toe of the pawl in its downward position thereby to lock the tooth or teeth of the same in engagement with one or more of the teeth of the ratchet and, when rotated from the former position, to exercise a thrust between the toe of the pawl and the movable jaw, to impart a final gripping movement to the latter.

The pawl shown and described in the said application is provided with a tail or rearward extension projecting rearwardly between the sides of the rear extension of the sleeve and being of substantially the same width as the space between the sides of said extension whereby it is held against material lateral movement.

Retraction of the sleeve and of the parts carried thereby can be conveniently effected by first grasping the sleeve with the hand and pressing rearwardly with the thumb upon the upper end of the arm of the pawl, thereby disengaging the tooth or teeth of the pawl from the ratchet teeth, after which the sleeve may be slid rearwardly along the handle to any desired position thereupon.

With the tail of the pawl constructed as shown in said application and with the transverse wall in the rear sleeve extension providing with the tops of the ratchet teeth therebelow a close running clearance for the tail of the pawl, care should be exercised in manipulating the arm of the pawl by the thumb in order to prevent the tail from temporarily blocking the rearward movement of the sleeve and movable jaw. One of the objects of my invention is to enable the pawl to operate where the space between the transverse wall and the tops of the ratchet teeth provides only a small running clearance for the tail of the pawl.

A further object of my invention is to prevent the disengagement of the tooth or teeth of the pawl from one or more of the teeth of the ratchet, as where only the outer end portions of the jaws are operating upon an object against heavy resistance, which will tend to cause the rear end of the sleeve to rock downwardly, thereby causing the rear end of the transverse wall in the rear sleeve extension to engage and to exert such pressure upon the upper surface of the tail of the pawl therebeneath as will cause such disengagement. I have changed the shape of the tail of the pawl and have so related the shape, thus changed, to the space in the rear extension of the sleeve through which the tail extends as to accomplish this objective.

A still further object of my invention is to provide a cooperating construction, and manner of mounting, of the pawl with respect to the upper surface of the handle whereby, when the operator retracts the sleeve and the parts carried thereby to a position where the tail of the pawl extends rearwardly of the ratchet teeth, further rearward movement of the sleeve will be prevented which will, in turn, prevent the sleeve together with the parts supported thereby, from dropping off the handle.

The cooperating constructions of the pawl, rear sleeve extension and handle whereby the foregoing objects are accomplished are shown in the drawing wherein Fig. 1 represents a side elevational view of a clamping device in the form of a wrench embodying my invention, showing the positions of the pawl, the rear sleeve extension and the cam when the pawl is in its locked position, a portion of the handle being omitted; Fig. 2 a view similar to Fig. 1, the fixed jaw being omitted, but showing the manner in which the pawl serves to block the rearward movement of the sleeve and attached parts when the tail of the pawl is moved rearwardly beyond the portion of the handle which is provided with the ratchet teeth; Fig. 3 a sectional view taken on the line 3—3 of Fig. 1; and Fig. 4 is an end view of the cam looking to the left in Fig. 1.

Describing by reference characters the parts shown in the drawing, 10 denotes the handle of the clamping device and 11 the fixed jaw, the upper surface of the handle being provided with ratchet teeth 12.

13 denotes a sleeve which is slidably mounted upon the handle and having a front vertical extension 14 to which a movable jaw 15 is attached at the front thereof, the sleeve also having a rear vertical extension 15ª, with a wide slot provided between the front and rear extensions of the sleeve.

16 denotes a shaft which is supported by and between the rear extension 15ª and the forward jaw-carrying extension 14, the said shaft being located above and substantially parallel with the plane of the edges of the ratchet teeth.

17 denotes a cam which is generally cylindrical in shape throughout the major portion of its length and which is mounted upon the shaft 16 and which has a forward base 18 extending transversely of the axis of the shaft 16 adapted to engage the vertical wall at the rear of the forward extension 14 of the sleeve, the diameter of the cam being such as to enable it to clear the ratchet teeth 12.

The rear operating surface of the cam is shown as consisting generally of two cooperating sections. The first section is a short section 19 which is substantially parallel with the forward face of the base 18 of the cam and which constitutes the portion of the rear surface of the cam which is nearest to the forward base 18 thereof. The second section 20 is a form of helix; that is to say, the outer edge of the section is in the shape of a spiral, but the operating surface thereof is inclined forwardly from the central portion thereof to the peripheral portion thereof, making an angle of approximately 80° to the axis of rotation of the cam. A shoulder 21 extends from the "high" end of the surface of the cam to the "low" end of such surface. While this shoulder overhangs the front end or toe of the pawl 30 when the said toe engages, or is in close proximity to, the portion 19 of the surface of the cam, said portion enables the toe to be lifted (in the manner to be described hereinafter) the slight distance necessary to disengage its tooth or teeth from the ratchet teeth.

The cam is also provided with a locking device 21ª for holding the teeth of the pawl 30 in engagement with the ratchet teeth when the cam is rotated to a position to enable the nose of the pawl to engage the surface 20 of the cam. The exterior of this locking device is cylindrical throughout the major portion thereof; the ends of the cylindrical portion being connected by a plane portion 21ᵇ which, except at its junction with the cylindrical surface, is nearer the axis of rotation of the cam than is the cylindrical surface.

Reference has been made hereinbefore to the pawl 30. This pawl is provided at the front or toe portion with one or more triangular teeth 31, each having its apex extending downwardly and is provided also with a vertical extension, shown as an arm 32, projecting from the forward end thereof and having an opening 33 therethrough for the reception of the shaft 16, the opening being of sufficiently greater width than the diameter of the shaft to permit the necessary movement of the toe of the pawl toward and from the ratchet teeth to enable the teeth of the pawl to be engaged with and disengaged from the ratchet teeth. The upper end of the arm 32 is provided with a rearwardly extending thumb piece 32ª.

33ª denotes a helical spring surrounding the shaft 16 and interposed between the sleeve extension 15ª and the arm 32 and exerting pressure upon the said arm, tending thereby to force the nose of the pawl downwardly whereby the tooth or teeth thereof may engage the ratchet teeth therebeneath.

The parts thus far described are substantially identical with the corresponding parts shown and described in my aforesaid prior application. It will be noted, however, that the bottom of the rear end of the tail 34 of the pawl slopes upwardly and rearwardly, as shown at 34ª; also that the upper surface of the rear end of the tail of the pawl is provided with a projection, preferably convex in contour, shown as having a rearwardly and upwardly sloping front surface 34ᵇ and a rearwardly and downwardly sloping rear surface 34ᶜ, the junction 34ᵈ of these surfaces providing a transversely extending elevated bearing for engagement by the transverse wall 35 in the rear sleeve extension. It will be noted that the junction of the front of the sloping surface 34ª with the bottom of the tail of the pawl is shown as slightly lower than the lower portion of said tail which extends forwardly therefrom; also that this junction is located rearwardly of the elevated bearing portion 34ᵈ of the projection on the upper surface of the rear end of the tail of the pawl. It will be noted further that the transverse wall 35 in the rear sleeve extension 15ª provides, with the tops of the ratchet teeth, a space for the reception of the tail of the pawl. This space is only sufficient to allow the tail of the pawl to be moved along said space with a small running clearance between the top of the tail of the pawl and the said wall when the tail of the pawl is resting upon the top of the ratchet teeth.

With the parts constructed and arranged as described, and with the surface 21ᵇ of the locking device above the pawl as in Figure 2, the operator may move the sleeve 13 and the parts attached thereto rearwardly by grasping the sleeve with his hand and pressing the thumb piece 32ª rearwardly by his thumb, which will lift the teeth of the pawl out of engagement with the ratchet teeth and enable the sleeve to be moved rearwardly without any obstruction or interference with such movement by the tail of the pawl, due to the inclined surface 34ª, and despite the fact that only a small running clearance is provided between the tail of the pawl and the vertical space provided therefor between the ratchet teeth and the wall 35, thereby enabling me to accomplish one of the aforesaid objects of my invention. Furthermore, assuming that the locking device is in the position shown in Fig. 1 and that the teeth of the pawl are in engagement with the ratchet teeth through the engagement of the rear end of the wall 35 with the upper surface of the tail of the pawl, the cam surface 21ª will be in engagement with the top of the pawl toe to prevent disengagement of the respective teeth. Furthermore, any downward movement of the rear sleeve extension, due to operating the wrench in the manner described hereinbefore, will react upon the junction 34ᵈ formed between the surfaces 34ª and 34ᵇ thereby to rock the front of the pawl downwardly about the junction formed between the beveled surface 34ª and the rear surface of the tail of the pawl extending forwardly therefrom, it being noted that the latter junction is located rearwardly of the junction 34ᵈ and is also located so that it must rest upon the top of a ratchet tooth when the teeth of the pawl are in engagement with their ratchet teeth. This construction and arrangement of parts enables me to realize the second object of my invention as set forth hereinbefore.

It should be noted further that the top of the wrench handle is provided with a recess 36 located immediately rearwardly of the rear ratchet tooth. When the sleeve is to be moved rearwardly, the operator grasps the same with his hand and rocks the toe of the pawl upwardly by means of the thumb piece 32ª, thereby disengaging the teeth on the pawl from the ratchet teeth therebelow, following which the sleeve may be moved rearwardly. However, as soon as the sleeve reaches the position where the tail of the pawl drops into the recess 36, the depth of the recess and the inclination of the surface 34ª are such that the rear edge of the rear tooth on the pawl will overlap the front face of the ratchet tooth therebelow, which will prevent the handle and the parts attached thereto from moving further along the handle, thereby realizing the third object of my invention.

Having thus described my invention, what I claim is:

1. A clamping device comprising a fixed jaw and a handle having teeth on its upper surface, a movable jaw assembly comprising a sleeve mounted for sliding movement on the handle and having a front extension provided with a movable jaw located above said handle and also having a rear extension extending above the handle and spaced from the front extension, a shaft supported by and extending between the said extensions above the teeth on the said handle, a rotary cam mounted on said shaft and having a front surface adapted to engage the front extension of the sleeve and also having a rear operating surface, a pawl interposed between the shaft and the upper surface of the handle and provided with a toe portion engageable with said rotary cam and having one or more teeth adapted to engage the teeth on the said handle and also having a rear or tail portion extending below the said shaft and within the rear extension of the sleeve, the said pawl having an operating arm extending upwardly therefrom and intermediate the ends thereof and provided with an opening for the passage of the said shaft, the opening being of greater vertical extent than the diameter of said shaft, a coil spring mounted on the said shaft and extending between the rear surface of said arm and the front surface of the rear extension of said sleeve, the bottom of the rear end portion of the tail of the pawl sloping upwardly.

2. In the wrench set forth in claim 1, the tail of the pawl being provided, on the top of the rear portion thereof which extends within the rear sleeve extension, with an upwardly extending projection the rear surface of which slopes downwardly and rearwardly from the upper end thereof and the tail of the pawl being also provided on the bottom with a transverse bearing portion on said projection and adapted to engage the top of a ratchet tooth when the tooth or teeth on the toe of the pawl are engaged with one or more of the teeth of the ratchet, and the rear sleeve extension having a transverse wall adapted to engage and exert pressure upon the top of the said projection through a slight downward movement of the said rear sleeve extension.

3. In the clamping device set forth in claim 1, the tail of the pawl being provided with a transverse bearing portion located along the lower surface of the pawl extending forwardly therefrom.

4. In the clamping device set forth in claim 1, the tail of the pawl being provided with a transverse bearing portion located along the lower surface of the pawl extending forwardly therefrom, and the rear extension of the sleeve having a transverse wall located above the ratchet teeth and being spaced from the said teeth a distance to provide a working clearance between the same and the portion of the tail of the pawl therebelow.

5. In the clamping device set forth in claim 1, the rear sleeve extension having a transverse wall spaced above the teeth on the handle thereby to provide a running clearance between the same and the portion of the tail of the pawl therebelow, the cam having a non-operating portion adapted, when positioned above the toe of the pawl, to enable the toe to be lifted thereby to disengage the tooth or teeth from the ratchet teeth and the handle being provided with a recess located rearwardly of the toothed surface and having a depth such that, when the rear end of the tail of the pawl drops thereinto, a tooth on the pawl will engage the front of a tooth therebelow on the ratchet.

CHARLES H. ORTMAN.

REFERENCES CITED

The following references are of record in the file of this patent:

UNITED STATES PATENTS

| Number | Name | Date |
| --- | --- | --- |
| 498,782 | Geisler | June 6, 1893 |
| 630,421 | Stewart | Aug. 8, 1899 |
| 755,466 | Dundon | Mar. 22, 1904 |
| 857,237 | Hansford | June 18, 1907 |
| 1,234,422 | Toczek et al. | July 24, 1917 |
| 1,299,510 | Rosander | Apr. 8, 1919 |
| 1,452,951 | Barker | Apr. 24, 1923 |